May 31, 1966    T. J. HUDDLESTON    3,253,972
WELDING SMOOTH, CURVED THERMOPLASTIC SECTIONS
Filed Aug. 2, 1961    4 Sheets-Sheet 1

INVENTOR.
T.J. HUDDLESTON
BY Hudson and Young
ATTORNEYS

INVENTOR.
T. J. HUDDLESTON
BY Hudson and Young
ATTORNEYS

May 31, 1966     T. J. HUDDLESTON     3,253,972
WELDING SMOOTH, CURVED THERMOPLASTIC SECTIONS

Filed Aug. 2, 1961     4 Sheets-Sheet 4

INVENTOR.
T. J. HUDDLESTON
BY Hudson and Young
ATTORNEYS

United States Patent Office 3,253,972
Patented May 31, 1966

3,253,972
WELDING SMOOTH, CURVED THERMOPLASTIC SECTIONS
Thomas J. Huddleston, Bartlesville, Okla., assignor to Phillips Petroleum Company, a corporation of Delaware
Filed Aug. 2, 1961, Ser. No. 128,789
6 Claims. (Cl. 156—304)

This invention relates to the welding of smooth, curved, and often irregularly shaped thermoplastic sections and particularly to a method and a means for effecting such welding operation. In one of its specific aspects this invention relates to a method for welding together three component parts of a thermoplastic bowling pin and to an apparatus for accomplishing the method.

There has recently been discovered a novel thermoplastic composition which is particularly applicable for the manufacture of bowling pins. These compositions are described in copending application Serial No. 95,091, filed March 13, 1961, by R. F. Craig et al. as comprising about 80 to 90 weight percent of a copolymer of ethylene and 1-butene having a melt index in the range of about 0.3 to 1.2 and about 10 to 20 weight percent of a polymer of isobutylene. A satisfactory method for fabricating the pin has been found to be that of preparing three component sections comprising a body, a head cap and a base cap, preferably by injection molding after which these component parts are welded together to form the finished bowling pin. This method of fabricating a bowling pin simplifies the molding operation and provides a pin wherein the bowling ball does not strike a weld but does present a problem in welding the sections together because of their curving, smooth surfaces.

It is therefore a principal object of this invention to provide a method for heat sealing the component parts of a thermoplastic bowling pin. It is also a principal object of this invention to provide an apparatus for heat sealing the component parts of a thermoplastic bowling pin. It is also an object of this invention to provide a method for welding smooth, curved, thermoplastic sections. Another object is to provide an apparatus for welding smooth, curved, thermoplastic sections. Other and further objects and advantages of this invention will be apparent to one skilled in the art upon reading the detailed description of the invention in connection with the appended drawing wherein:

Figure 1:
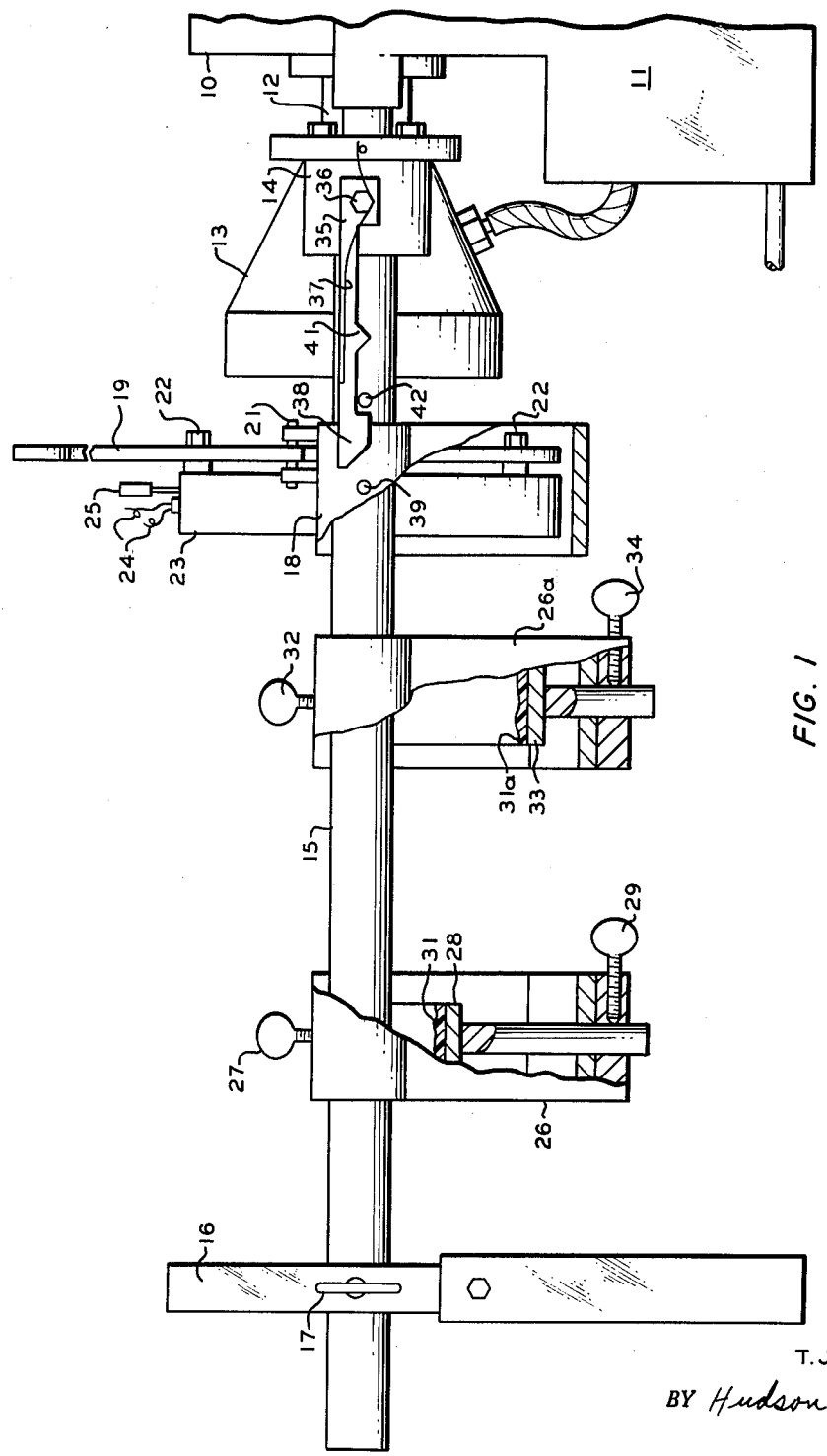
FIGURE 1 is an elevational view, partly in section, of a preferred embodiment of the apparatus of this invention.

Referring now to the drawing, and particularly to FIGURE 1, a cylinder assembly 10 shown at the extreme right of FIGURE 1 supported upon cylinder support 11 operates piston 12 so as to propel concave vacuum chuck 13 and its associated support member 14 in a forward and a reverse direction along slide rods 15 which rods are supported by member 14 and back-up plate 16 which is adjustable on slide rods 15 by means of thumb screw 17. Heater support 18 is slidably mounted on slide rods 15. Heater handle 19 is pivotally mounted on support 18 by the pivoting member 21 and the pivot handle 19 is secured to heater 23 by means of bolts indicated at 22. Heater 23 is heated electrically by means of electrical wires 24 connected to a suitable electrical source (not shown). The temperature of the heater is indicated by thermometer 25. Jig support 26 is slidably mounted upon slide rods 15 and can be secured in a desired position by means of thumb screw 27. Jig 28 is removably and adjustably secured to support 26 by means of thumb screw 29 and is shown in the form of a cradle having a plastic lining 31 to conform to the shape of the object being supported therein. Jig support 26a is slidably mounted upon slide rods 15 and is secured in position by thumb screw 32. Jig 33 is adjustably and removably secured to support 26a by means of thumb screw 34 and is also made in the shape of a cradle having a lining of plastic material 31a. Release arm 35 is pivoted at 36 and maintained in position by spring 37. Click 38 coacts with pin 39 and cam 41 coacts with pin 42 to release the heater plate 23 from the thermoplastic sections heated thereby.

Figure 2:
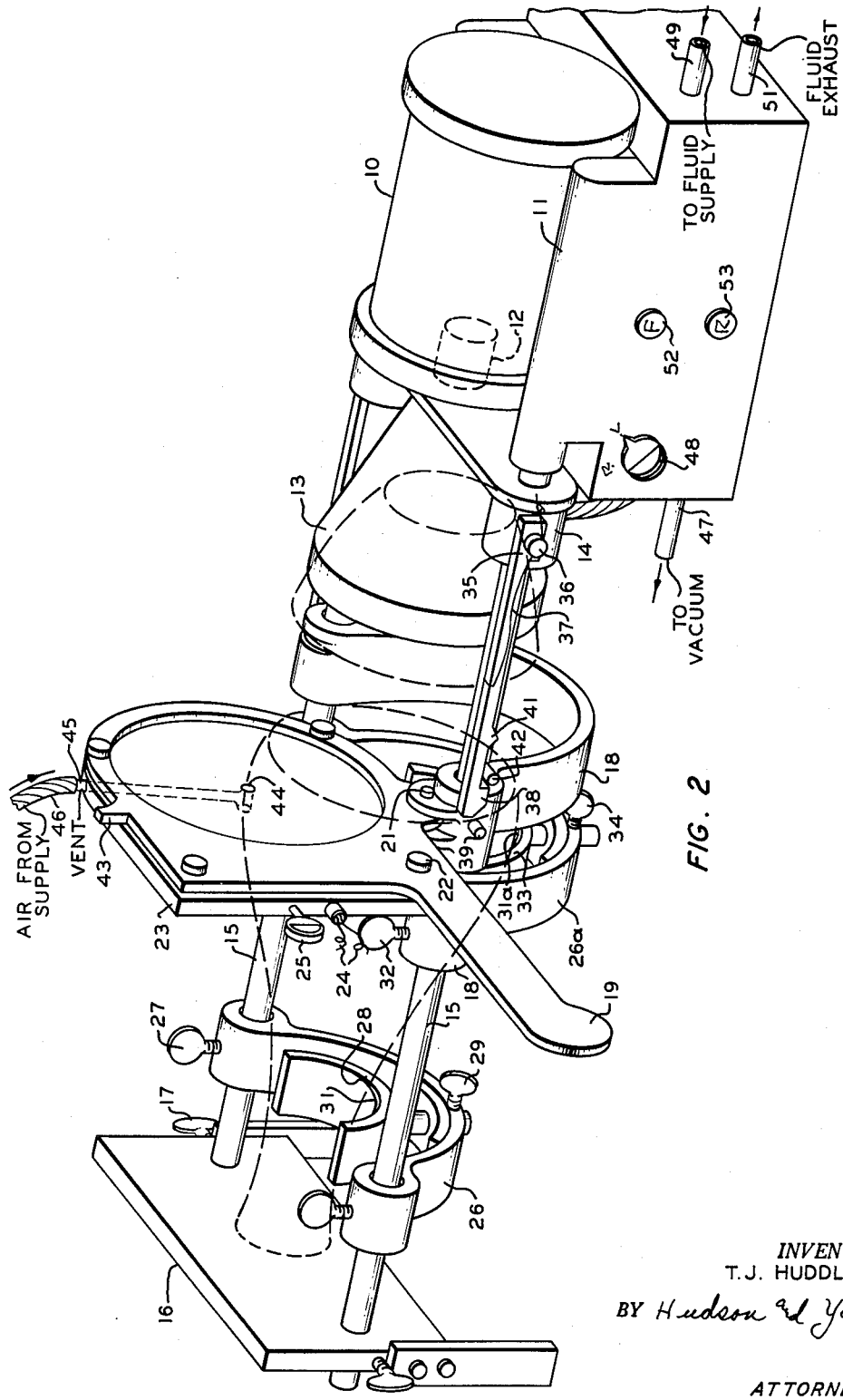
FIGURE 2 is a perspective view of the preferred embodiment of the apparatus of the invention.
Figure 3:
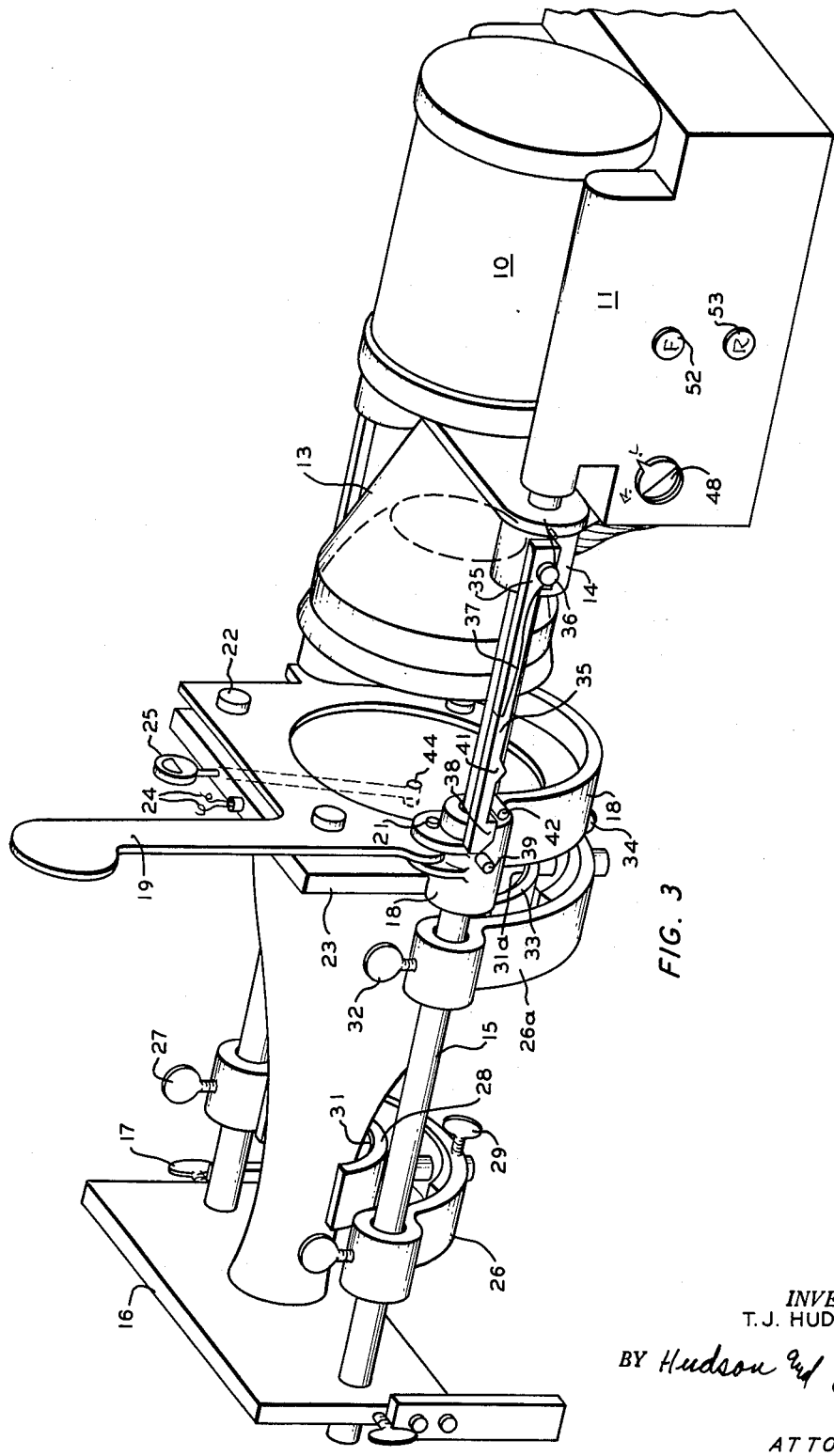
FIGURE 3 is another perspective view of the apparatus of the invention.

FIGURE 2 is a perspective view of the apparatus of FIGURE 1 with the heater handle 19 in such position that the heater is partially pivoted out from the line of travel of the chuck 13. This view shows the stop 43 which rests on slide rod 15 when the heater is in heating position and also shows the vent which extends from opening 44 in heater 23 to the outlet tube 45. If desired, positive air pressure can be applied to the inside of the members being heated by means of air introduced through tubing 46. Chuck 13 can be evacuated from a vacuum source (not shown) via conduit 47 by means of 3-way valve 48 which is shown in position for evacuating the chuck 13 and the vacuum can be released by moving the 3-way valve 48 to release position. Piston 12 in cylinder 10 can be operated by any type of fluid pressure including a gas such as air or steam or a liquid such as oil or water supplied via conduit 49 and exhausted via conduit 51 by means of a conventional 3-way valve operated by the forward button 52 and the reverse button 53. The apparatus is illustrated with the piston 12 being operated by a fluid cylinder; however, any means for reciprocating piston 12 can be employed as will be obvious to those skilled in this art. Examples of other means include a spring biased solenoid, a rack and pinion, or a system of bevel gears operated by a reversible motor.

Figure 4:
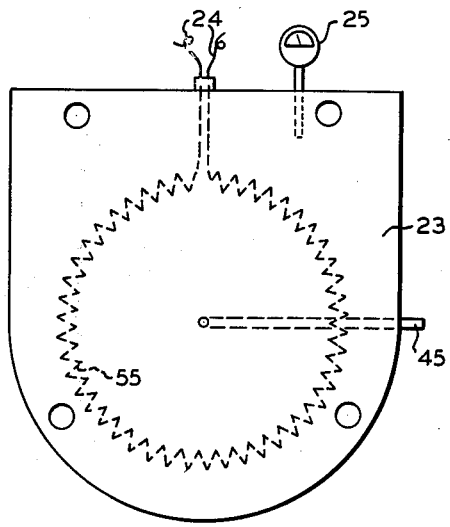
FIGURE 4 is an X-ray elevational view of the heater element of the apparatus of the invention.

The heater 23 is shown in FIGURE 4 as comprising a resistance element 55 positioned between the opposing surfaces of the heater 23; however, other types of heaters can be employed such as heating cartridges imbedded in the heater plate.

Figure 5:
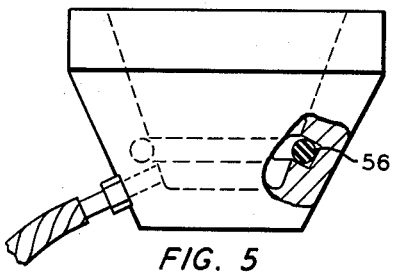
FIGURE 5 is an elevational view, partly in section, of a vacuum chuck designed particularly for a bowling pin base cap.
Figure 6:
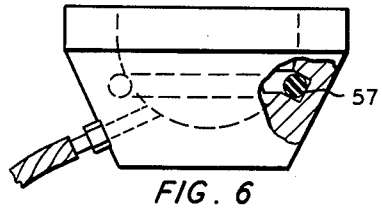
FIGURE 6 is an elevational view, partly in section of another vacuum chuck designed particularly for a bowling pin head cap.

The smooth, curved component to be secured by the vacuum chuck can be effectively sealed in the chuck by means of a resilient O-ring indicated as 56 in FIGURE 5 and 57 in FIGURE 6. The interior of the vacuum chuck can be fabricated so as to conform to the shape of the article to be secured or can be substantially hemispherical or parabolical in shape so as to accommodate various smooth, curved objects.

Figure 7:
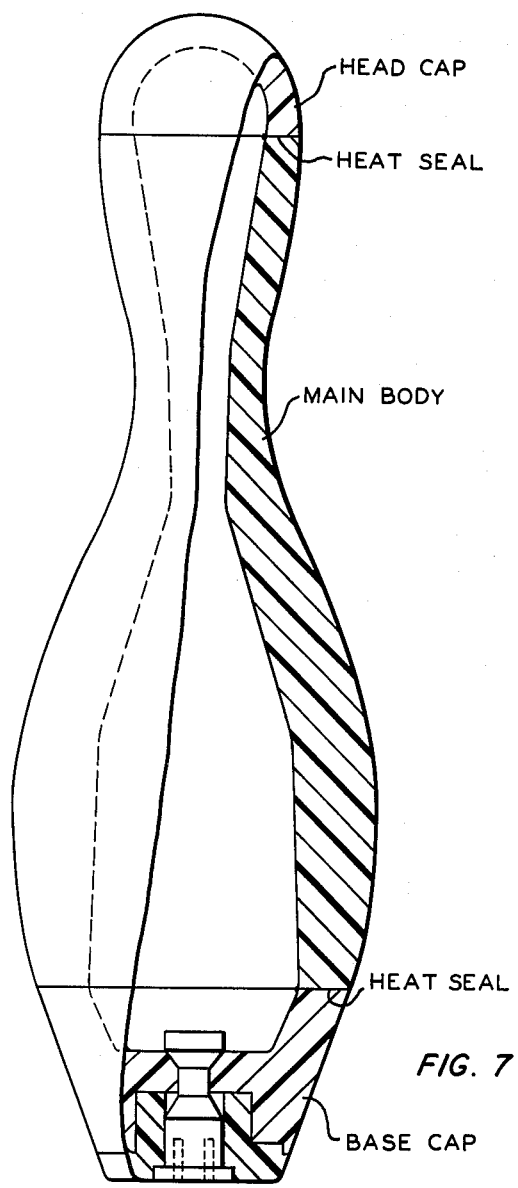
FIGURE 7 is an elevational view, in section, of a bowling pin such as that sealed by the apparatus of the invention.

FIGURE 7 shows a cross-sectional view of a bowling pin constructed so as to be adaptable to the welding method employed in this invention and utilizing the apparatus described herein.

The opposed faces of the heater 23 should be substantially flat and substantially parallel so that the softened edges of the pieces to be joined will be aligned on a common axis. The fluid actuated piston 12 and cylinder 10 should advance the piece in the vacuum chuck 13 against the heater 23 and advance the heater 23 against the piece in jigs 28 and 33 with sufficient force to align the pieces with the heater 23 so that the pieces will be in alignment when the edges of the pieces are softened. The vent which extends from the opening 44 through the heater plate 23 to the outlet 45 will prevent formation of a vacuum on the interior of the pieces during the heating period. Removal of the pieces from contact with the heater can be facilitated by supplying positive fluid pressure such as air pressure to the outlet tube 45.

The operation of the apparatus illustrated and described herein as applied to the sealing of the component parts of a polyethylene bowling pin will now be described. The bowling pin main body is placed in the jigs 28 and 33 with the top portion against support plate 16 and the base end toward the heater 23. The base cap is placed in the vacuum chuck 13 and the 3-way valve 48 turned to V to evacuate the chuck and pull the base cap firmly into the chuck against the O-ring 56. The forward button 52 is then pressed causing piston 12 to move forward forcing the base cap against the heater plate 23 and in turn forcing the heater plate 23 against the pin main body. When the piston 12 advances the chuck 13 and heater 23 the release arm 35 rides over the top of and engages click 38 with pin 39 which is secured to heater support 18.

When the pin main body and the base cap have been in contact with the heater for a time sufficient to soften the edges of the pieces at the temperature of the heater, the reverse button 53 is pressed causing the piston 12 to retract whereby the release arm 35 pulls the heater from the pin main body. The piston continues to retract and cam 41 contacts pin 42 and lifts release arm 35 disengaging click 38 from pin 39 so that piston 12 and chuck 13 pull the base cap free from heater 23 when heater support 18 strikes pin 42 and is stopped thereby.

The heater 23 is then rotated about pivot 21 from between the base cap and the pin main body. The forward button 52 is then pressed and piston 12 advances forcing the base cap against the pin main body, thus sealing the softened edges of the pieces. When the seal has cooled sufficiently to form a weld the 3-way valve 48 is turned to R to vent the chuck to the atmosphere and release the base cap. The reverse button 53 is then pressed retracting the piston 12 and chuck 13, and the welded article is lifted from the apparatus.

The head cap is welded to the pin main body by replacing the base cap chuck with a chuck to fit the head cap and reversing the position of the jigs 28 and 33. The pin main body with the base cap welded thereto is placed in the jigs with the base cap against the support plate 16 and the open top toward the heater 23. The head cap is secured in the vacuum chuck and the above steps are repeated.

When making a given number of bowling pins it is usually preferred to weld the base cap to the pin main body on all of the pins and then change the apparatus and weld the head caps to the pin main body. For continuous production it may be desirable to operate one apparatus for sealing the base cap onto the pin main body and a second apparatus for sealing the head cap to the pin main body.

That which is claimed is:

1. The method of welding together smooth, curved sections of thermoplastic which comprises securing a first thermoplastic section in fixed position; heating the first thermoplastic section and a second thermoplastic section, at the surfaces to be joined, to a softened condition; moving the second thermoplastic section into contact with said first thermoplastic section in a fixed line of travel coaxial with the axis of said first thermoplastic section and free for angular movement with respect to said fixed line of travel.

2. Apparatus for welding a cap section to a body section of a thermoplastic bowling pin comprising a fluid actuated piston and cylinder; a vacuum chuck having a resilient O-ring sealing member therein secured to said piston and adapted to hold therein a bowling pin cap free for angular movement with respect to the fixed line of travel of said piston; means to evacuate said chuck; a back-up plate; a pair of rods, parallel in a horizontal plane connecting said cylinder and said back-up plate; a heater support member slidably mounted on said rods; a heater having parallel, opposing heating surfaces pivotally mounted upon said heater support; clamping means to secure a bowling pin body in alignment with said heater; a first pin extending horizontally from said heater support; a second pin extending horizontally from said rods to limit the travel of said heater support in the direction of said vacuum chuck; a release arm having one end pivotally connected to said piston and having the other end terminating in a click so that the arm rides over the first pin in its forward travel and catches said first pin in its reverse travel; a cam member attached to said arm and spaced from said catch so that said cam rides over said second pin and lifts said arm to release said first pin from said click during the reverse travel of said arm and before said second pin stops the travel of said heater support; and means to supply fluid to said cylinder for forward and reverse movement of said piston.

3. Apparatus for welding together smooth, curved thermoplastic sections comprising a support frame; a heater having substantially flat and parallel opposing heating surfaces pivotally and slidably mounted on said frame; means to secure a first thermoplastic section in alignment with a first side of said heater; a concave vacuum chuck having a resilient O-ring sealing member therein for securing a second thermoplastic member in aligning relationship with a second side of said heater, said second section being free for angular movement with respect to a line of travel coaxial with said first and second sections; means to evacuate said vacuum chuck; means to move said vacuum chuck toward said heater so as to contact said second thermoplastic section with said heater; to align said second thermoplastic section with said heater, and to move said heater into contact with said first thermoplastic section; means to move said vacuum chuck so as to move said heater away from said first thermoplastic section and to move said second thermoplastic section away from said heater; means to move said vacuum chuck so as to join said second thermoplastic section and said first thermoplastic section in welding relationship when said heater is pivotally rotated from between said first and second thermoplastic sections; and means to release the vacuum in said vacuum chuck and to withdraw said chuck from said welded sections.

4. Apparatus for welding together smooth, curved thermoplastic sections comprising a support frame; a heater support slidably mounted on said frame; a heater having substantially flat, parallel opposing surfaces pivotally mounted on said heater support; means to secure a first thermoplastic section in fixed alignment with a first side of said heater; a concave vacuum chuck having a resilient O-ring sealing member therein positioned to secure a second thermoplastic section in aligning relationship with a second side of said heater, said second section being free for angular movement with respect to a line of travel coaxial with said first and second sections; means to evacuate said chuck; means to advance said chuck toward said heater and to retract said chuck away from said heater; and means associated with said chuck to engage said heater support when said chuck is advanced toward said heater and to disengage said heater support and arrest movement of said heater support toward said chuck when said chuck is retracted.

5. The apparatus of claim 4 wherein the means to secure said first thermoplastic section comprises a plurality of jigs to cradle said piece in substantially fixed alignment with said heater.

6. The apparatus of claim 4 wherein the means associated with said chuck comprises a first pin connected to said heater support; a second pin connected to said frame; a spring loaded release arm having one end pivotally connected to said chuck and the other end beveled and terminating in a click to ride over and engage said first pin when said chuck is advanced; and a cam associated with said release arm to ride over said second pin and disengage said click from said first pin.

References Cited by the Examiner

UNITED STATES PATENTS

| | | | |
|---|---|---|---|
| 2,665,739 | 1/1954 | Carson et al. | 156—499 |
| 2,730,370 | 1/1956 | Brewster | 279—3 |
| 3,013,925 | 12/1961 | Larsen | 156—499 |
| 3,053,726 | 9/1962 | Larson et al. | 156—304 |

EARL M. BERGERT, *Primary Examiner.*

ALEXANDER WYMAN, *Examiner.*

R. I. SMITH, M. L. KATZ, *Assistant Examiners.*